US010554843B2

(12) United States Patent
Ueno et al.

(10) Patent No.: US 10,554,843 B2
(45) Date of Patent: Feb. 4, 2020

(54) ELECTRONIC APPARATUS, NON-TRANSITORY COMPUTER-READABLE MEDIUM STORING PROGRAM, AND WIRELESS COMMUNICATION METHOD

(71) Applicant: SEIKO EPSON CORPORATION, Tokyo (JP)

(72) Inventors: Taichi Ueno, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/126,449

(22) Filed: Sep. 10, 2018

(65) Prior Publication Data
US 2019/0082071 A1 Mar. 14, 2019

(30) Foreign Application Priority Data
Sep. 12, 2017 (JP) ................................ 2017-174697

(51) Int. Cl.
| H04N 1/00 | (2006.01) |
| H04W 36/06 | (2009.01) |
| H04W 4/80 | (2018.01) |
| H04W 72/04 | (2009.01) |
| H04W 88/08 | (2009.01) |
| H04W 8/22 | (2009.01) |
| H04W 36/00 | (2009.01) |
| H04W 8/00 | (2009.01) |

(52) U.S. Cl.
CPC .......... *H04N 1/00973* (2013.01); *H04W 4/80* (2018.02); *H04W 36/03* (2018.08); *H04W 88/08* (2013.01); *H04N 2201/0094* (2013.01); *H04W 8/005* (2013.01); *H04W 36/06* (2013.01); *H04W 72/0453* (2013.01)

(58) Field of Classification Search
None
See application file for complete search history.

(56) References Cited

U.S. PATENT DOCUMENTS

| 8,503,331 B2* | 8/2013 | Naito | H04W 76/10 370/254 |
| 2009/0323608 A1* | 12/2009 | Adachi | H04W 48/18 370/329 |
| 2010/0279633 A1* | 11/2010 | Baker | H03L 7/085 455/115.2 |

(Continued)

FOREIGN PATENT DOCUMENTS

JP 2016-072729 A 5/2016

*Primary Examiner* — Beniyam Menberu
(74) *Attorney, Agent, or Firm* — Global IP Counselors, LLP

(57) ABSTRACT

An electronic apparatus includes a wireless communication unit, which performs a first wireless communication process and a second wireless communication process using an internal access point that operates in a first frequency band or a second frequency band, and a processing unit. The wireless communication unit transmits information of an operation frequency band of the internal access point on connection demand with respect to the internal access point through the second wireless communication process. In a case where a demand to change the operation frequency band is received from a terminal apparatus, the processing unit performs a process of changing the operation frequency band of the internal access point.

13 Claims, 6 Drawing Sheets

(56) References Cited

U.S. PATENT DOCUMENTS

| | | | | |
|---|---|---|---|---|
| 2014/0141826 | A1* | 5/2014 | Cordeiro | H04W 48/14 |
| | | | | 455/509 |
| 2014/0269468 | A1* | 9/2014 | Jia | H04W 24/02 |
| | | | | 370/311 |
| 2014/0355527 | A1* | 12/2014 | Vaidya | H04W 76/15 |
| | | | | 370/329 |
| 2015/0215939 | A1* | 7/2015 | Kikkawa | H04W 76/14 |
| | | | | 370/329 |
| 2015/0250012 | A1* | 9/2015 | Shibata | H04W 76/14 |
| | | | | 370/254 |
| 2015/0319235 | A1* | 11/2015 | Liu | H04L 29/08072 |
| | | | | 709/204 |
| 2015/0327069 | A1* | 11/2015 | Fu | H04W 12/06 |
| | | | | 726/5 |
| 2016/0007247 | A1* | 1/2016 | Lee | H04W 36/0066 |
| | | | | 370/331 |
| 2016/0073377 | A1* | 3/2016 | Nagara | H04W 72/02 |
| | | | | 455/455 |
| 2016/0323921 | A1* | 11/2016 | Thanayankizil | H04W 76/14 |
| 2016/0373505 | A1* | 12/2016 | Shan | H04L 12/6418 |
| 2017/0332210 | A1* | 11/2017 | Iwami | H04L 67/1044 |

* cited by examiner

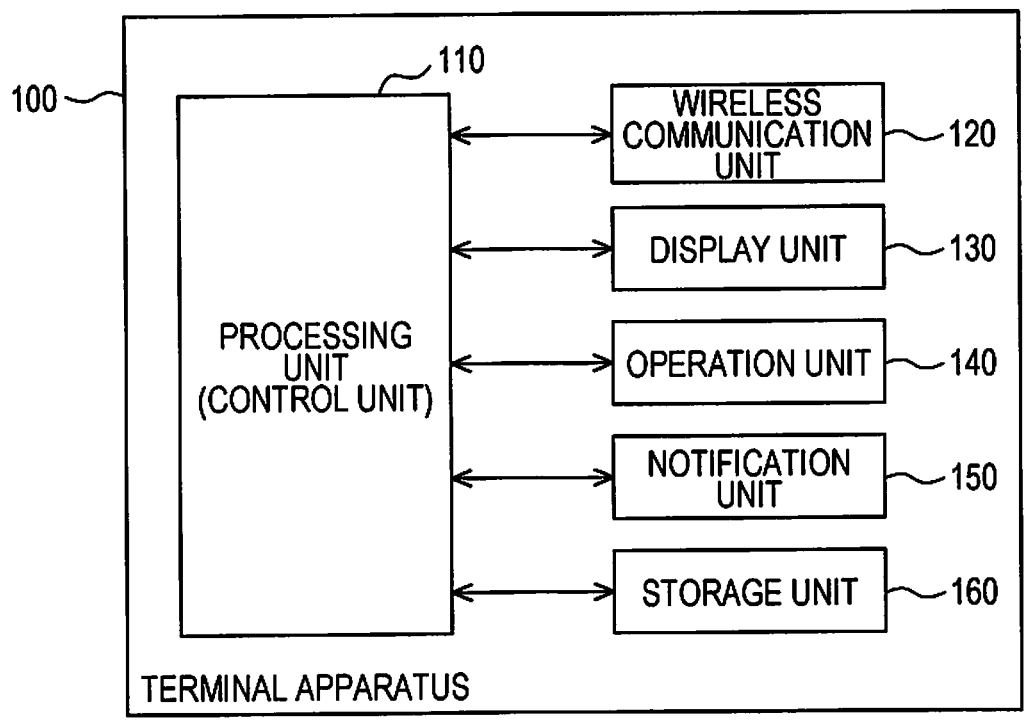
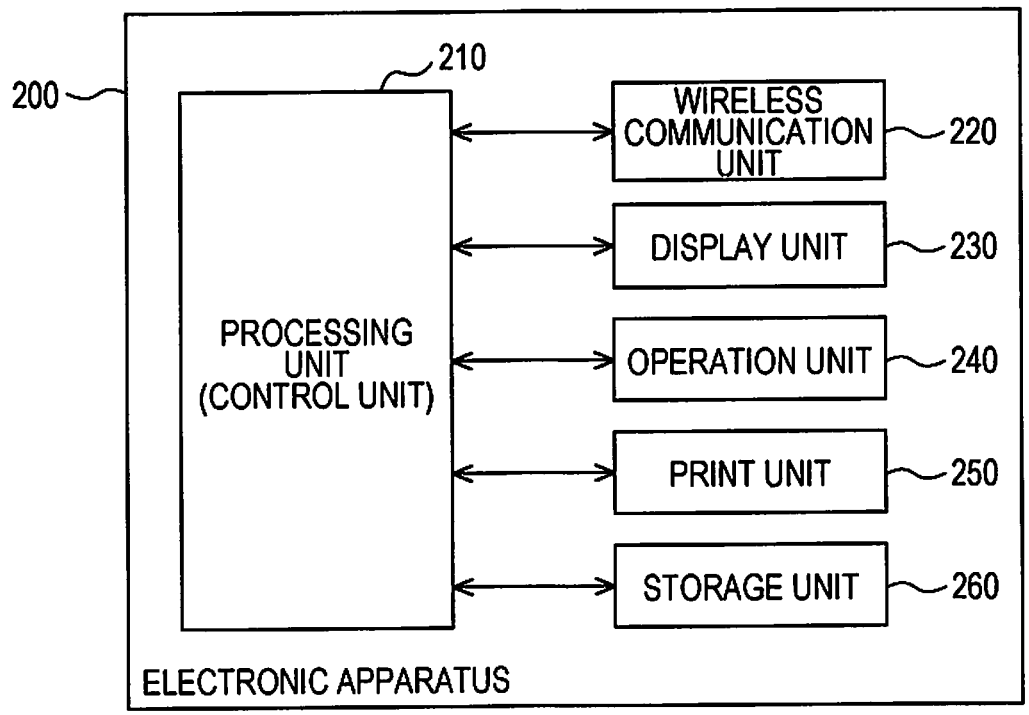

ELECTRONIC APPARATUS, NON-TRANSITORY COMPUTER-READABLE MEDIUM STORING PROGRAM, AND WIRELESS COMMUNICATION METHOD

BACKGROUND

1. Technical Field

The present invention relates to an electronic apparatus, a non-temporary computer-readable medium storing a program, a wireless communication method, and the like.

2. Related Art

A wireless communication standard includes a standard in which a plurality of communication frequency bands (operation frequency bands) exist. For example, a Wi-Fi (registered trademark) standard includes a standard using a band of 2.4 GHz and a standard using a band of 5 GHz.

In addition, wireless communication in conformity to a Wi-Fi Direct (WFD) standard is known as wireless communication in conformity to the Wi-Fi standard. In the WFD, devices directly perform the wireless communication without passing through an external access point such as a wireless LAN router.

JP-A-2016-72729 discloses a case where an access point responds to Wi-Fi connections in both 2.4 GHz and 5 GHz and a case where an electronic apparatus (multifunction peripheral) activates an internal access point (software access point) to form a wireless network.

There is a case where the electronic apparatus, which activates the internal access point, includes only one wireless communication device (Wi-Fi chip) that performs communication in conformity to the Wi-Fi standard due to a cost relationship. In this case, it is possible to switch the operation frequency band of the internal access point between 2.4 GHz and 5 GHz. However, it is not possible for the internal access point to simultaneously operate in the two operation frequency bands.

In addition, there is a case where a terminal apparatus, which wirelessly connects to the electronic apparatus, does not respond to an operation in any of the plurality of operation frequency bands. In an example of the Wi-Fi standard, the terminal apparatus, which responds to the band of 2.4 GHz that can be realized at a relatively low cost but does not respond to the band of 5 GHz at a high cost, is considered.

In a case where a side of the electronic apparatus is being operated in the band of 5 GHz and a connection demand is provided from the terminal apparatus responding to only the band of 2.4 GHz, there is a problem in that the terminal apparatus is not capable of connecting to the electronic apparatus. JP-A-2016-72729 does not entirely disclose a detailed method for dynamically changing the operation frequency.

SUMMARY

An advantage of some aspects of the invention is to provide an electronic apparatus, a non-temporary computer-readable medium storing a program, a wireless communication method, and the like, which dynamically change an operation frequency band of an access point according to a wireless communication capability of a terminal apparatus.

According to an aspect of the invention, there is provided an electronic apparatus including: a wireless communication unit that performs a first wireless communication process using an internal access point, which operates in a first frequency band or a second frequency band different from the first frequency band, of the electronic apparatus, and a second wireless communication process different from the first wireless communication process; and a processing unit that controls communication of the wireless communication unit, in which, in a case where a connection demand with respect to the internal access point is provided, the wireless communication unit transmits information of an operation frequency band of the internal access point on demand to a terminal apparatus through the second wireless communication process, and in which, in a case where the wireless communication unit receives a demand to change the operation frequency band into the first frequency band from the terminal apparatus, the processing unit performs a process of changing the operation frequency band of the internal access point from the second frequency band into the first frequency band.

In the electronic apparatus, the information of the operation frequency band of the internal access point in the first wireless communication process is transmitted to the terminal apparatus through the second wireless communication process, the operation frequency band of the internal access point is dynamically changed according to a change demand from the terminal apparatus. In this manner, in a premise that it is not possible for the internal access point to simultaneously perform an operation in the first frequency band and an operation in the second frequency band, it is possible to set an appropriate operation frequency band in accordance with a wireless communication capability on a side of the terminal apparatus.

In the electronic apparatus, the second wireless communication process may be a wireless communication process using a second internal access point which operates in the first frequency band. In a case where the connection demand with respect to the internal access point is provided, the wireless communication unit may stop the internal access point, may activate the second internal access point for temporary connection, and may transmit information of the operation frequency band of the internal access point before stopping the internal access point with respect to the terminal apparatus through the second wireless communication process. In a case where the demand to change the operation frequency band into the first frequency band is received from the terminal apparatus through the second wireless communication process, the processing unit may change the operation frequency band from the second frequency band into the first frequency band, and may reactivate the internal access point.

According to the electronic apparatus, it is possible to transmit the information of the operation frequency band to the terminal apparatus through the wireless communication process using the second internal access point.

In addition, in the electronic apparatus, the wireless communication unit may transmit the information of the operation frequency band of the internal access point before stopping the internal access point with respect to the terminal apparatus using a beacon signal in conformity to a Wi-Fi standard in the second wireless communication process.

In this manner, it is possible to transmit the information of the operation frequency band to the terminal apparatus using the beacon signal in conformity to the Wi-Fi standard (SSID broadcast in a narrow sense).

In addition, in the electronic apparatus, the wireless communication unit may transmit identification information and password of the internal access point to the terminal apparatus in the second wireless communication process.

In this manner, in the second wireless communication process, it is possible to transmit information used for a connection to the internal access point, and thus it is possible to improve convenience of the user.

In addition, in the electronic apparatus, the internal access point and the second internal access point may have different pieces of identification information.

In this manner, in a case where the identification information (an SSID in a narrow sense) is differentiated, it is possible to appropriately identify the internal access point and the second internal access point.

In addition, in the electronic apparatus, the second wireless communication process may be a wireless communication process in conformity to a Bluetooth communication standard, the wireless communication unit may transmit information of the operation frequency band of the internal access point with respect to the terminal apparatus using a beacon signal in conformity to the Bluetooth communication standard in the second wireless communication process, and, in a case where the demand to change the operation frequency band into the first frequency band is received from the terminal apparatus through the second wireless communication process, the processing unit may change the operation frequency band from the second frequency band into the first frequency band.

In this manner, it is possible to transmit the information of the operation frequency band to the terminal apparatus using the beacon signal (an advertise packet in a narrow sense) in conformity to the Bluetooth communication standard.

In addition, in the electronic apparatus, after the demand to change the operation frequency band into the first frequency band is received from the terminal apparatus, the processing unit may perform a process of stopping the internal access point and reactivating the internal access point using the first frequency band.

In this manner, it is possible to connect to an operation of the internal access point until an operation frequency band change demand is received, and thus it is possible to suppress communication with the terminal apparatus, which is completely connected, from being inhibited.

In addition, in the electronic apparatus, in a case where connection between the terminal apparatus, which demands to change the operation frequency band, and the internal access point is cut, the processing unit may perform a process of returning the operation frequency band of the internal access point from the first frequency band to the second frequency band.

In this manner, according to a connection situation of the terminal apparatus, it is possible to change the operation frequency band from the first frequency band to the second frequency band.

In addition, in the electronic apparatus, the processing unit may determine whether or not the terminal apparatus, in which the connection with the internal access point is cut, is the terminal apparatus, which demands to change the operation frequency band, based on identification information of the terminal apparatus.

In this manner, it is possible to appropriately determine whether or not the terminal apparatus whose connection is cut is the terminal apparatus which demands to change the operation frequency band.

In addition, according to another aspect of the invention, there is provided a non-temporary computer-readable medium storing a program, which operates a terminal apparatus that performs wireless communication with an electronic apparatus including a wireless communication unit that performs the wireless communication using an internal access point, which operates in a first frequency band or a second frequency band different from the first frequency band, of the electronic apparatus, the program causing the terminal apparatus to function as: a wireless communication unit that performs the wireless communication using the first frequency band; and a processing unit that controls communication of the wireless communication unit, in which, in a case where information of an operation frequency band of the internal access point of the electronic apparatus is received from the electronic apparatus, the processing unit determines whether or not the operation frequency band of the internal access point is the first frequency band, and in which, in a case where the processing unit determines that the operation frequency band of the internal access point is not the first frequency band, the wireless communication unit transmits a demand to change the operation frequency band of the internal access point into the first frequency band to the electronic apparatus.

In the non-temporary computer-readable medium storing a program, in a case where the information of the operation frequency band of the internal access point is received from the electronic apparatus, comparison with a wireless communication capability of the terminal apparatus is performed, and an operation frequency band change demand is transmitted if necessary. In this manner, in a premise that it is not possible for the internal access point of the electronic apparatus to simultaneously perform an operation in the first frequency band and an operation in the second frequency band, it is possible to cause the electronic apparatus to perform setting of a proper operation frequency band in accordance with a wireless communication capability on a side of the terminal apparatus.

According to further another aspect of the invention, there is provided a wireless communication method using an electronic apparatus, which performs wireless communication using an internal access point, which operates in a first frequency band or a second frequency band different from the first frequency band, of the electronic apparatus, and a terminal apparatus which performs the wireless communication using the first frequency band, the method including: transmitting information of an operation frequency band of the internal access point on demand with respect to the terminal apparatus by the electronic apparatus in a case where a connection demand with respect to the internal access point is provided; receiving the information of the operation frequency band of the internal access point of the electronic apparatus from the electronic apparatus and determining whether or not the operation frequency band of the internal access point is the first frequency band by the terminal apparatus; transmitting a demand to change the operation frequency band of the internal access point into the first frequency band to the electronic apparatus by the terminal apparatus in a case where it is determined that the operation frequency band of the internal access point is not the first frequency band; and changing the operation frequency band of the internal access point from the second frequency band into the first frequency band by the electronic apparatus in a case where the demand is received.

BRIEF DESCRIPTION OF THE DRAWINGS

The invention will be described with reference to the accompanying drawings, wherein like numbers reference like elements.

FIG. 2 illustrates a configuration example of the terminal apparatus.

FIG. 3 illustrates a configuration example of the electronic apparatus.

DESCRIPTION OF EXEMPLARY EMBODIMENTS

Hereinafter, embodiments will be described. Meanwhile, the embodiments, which will be described below, do not unreasonably limit content of the invention disclosed in claims. In addition, all configurations described in the embodiments are not limited to essential components of the invention.

1. COMMUNICATION SYSTEM

Figure 1:
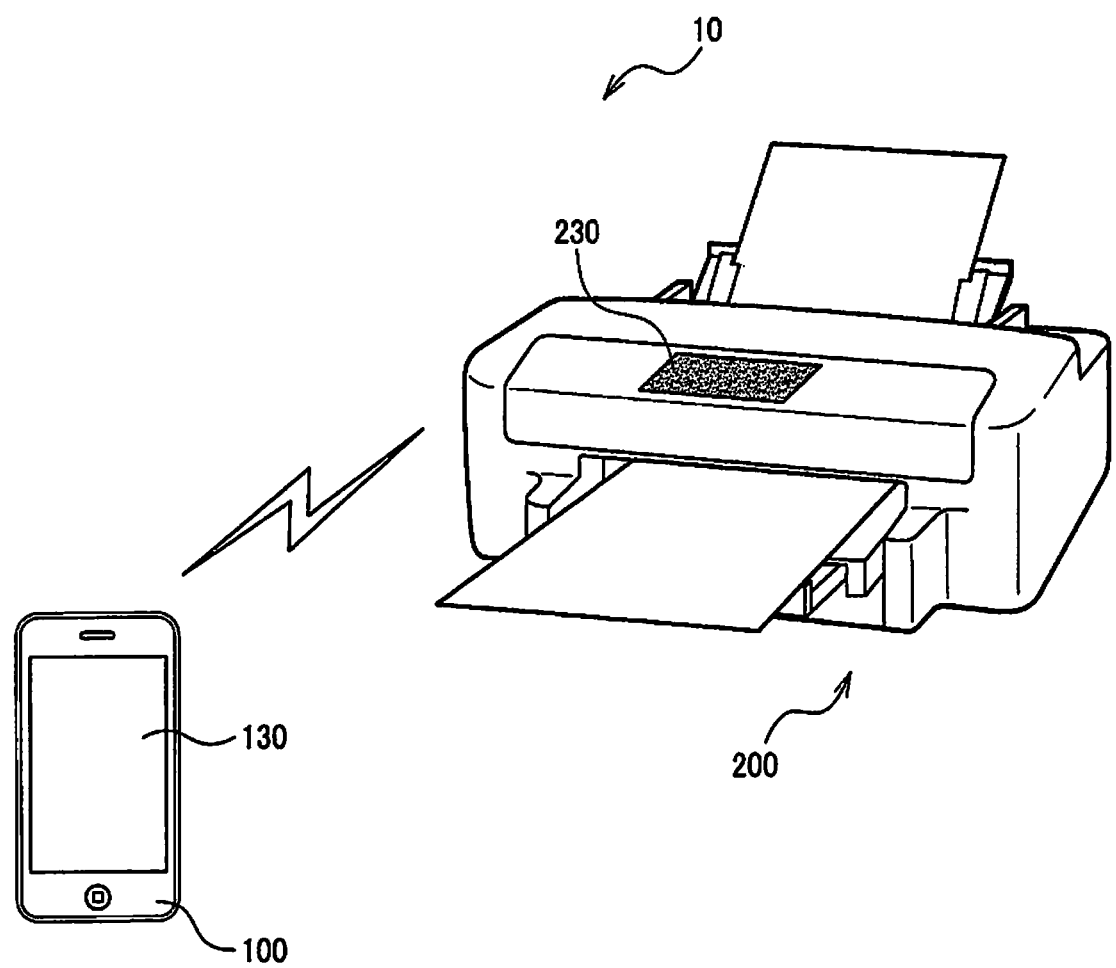
FIG. 1 illustrates a configuration example of a communication system which includes a terminal apparatus and an electronic apparatus.

FIG. 1 is a diagram schematically illustrating an example of a communication system 10 according to the invention. The communication system 10 includes a terminal apparatus 100 and an electronic apparatus 200.

The terminal apparatus 100 may be a portable terminal apparatus, such as a smart phone or a tablet terminal, or may be a device such as a PC. The terminal apparatus 100 includes a new connection terminal 300 and an existing connection terminal 400 which will be described later with reference to FIG. 4. Meanwhile, whether the terminal apparatus 100 is treated as the new connection terminal 300 or the existing connection terminal 400 differs depending on a connection situation with respect to the electronic apparatus 200.

Figure 4:
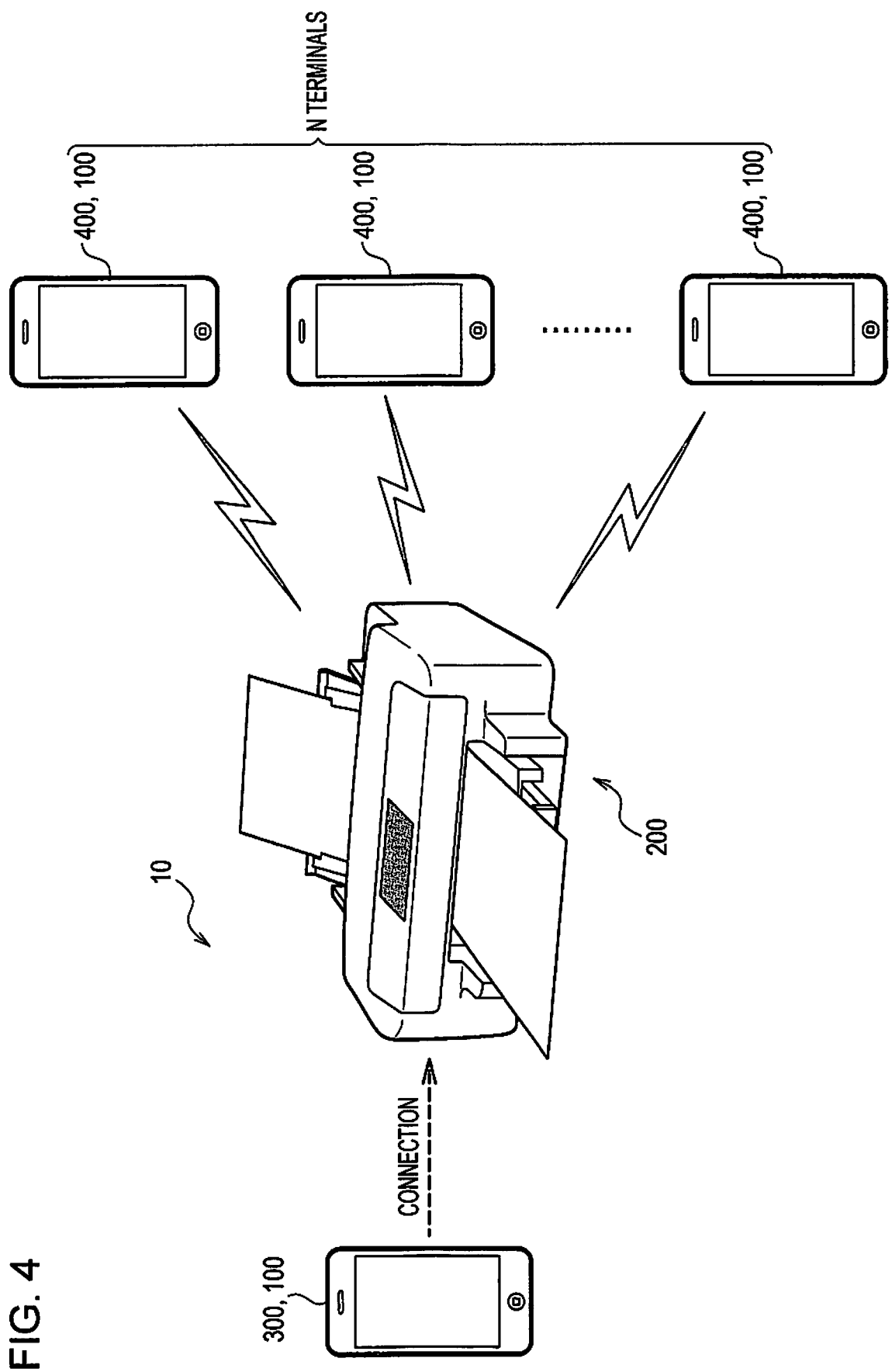
FIG. 4 is a schematic diagram illustrating a new connection terminal and existing connection terminals.

The electronic apparatus 200 is, for example, a printer (print apparatus). Otherwise, the electronic apparatus 200 may be a scanner, a facsimile device, or a copying machine. The electronic apparatus 200 may be a Multifunction Peripheral (MFP), which has a plurality of functions. A multifunction peripheral, which has a print function, is also an example of the printer. Otherwise, the electronic apparatus 200 may be a projector, a head mounted display device, a wearable device (a list type wearable device or the like), a bio-information measurement device (a pulsimeter, a pedometer, an activity meter, or the like), a robot, a video device (a camera or the like), a portable information terminal (a smart phone, a portable game machine, or the like), a physical quantity measurement device, or the like. Meanwhile, the communication system 10 is not limited to the configuration of FIG. 1, and various modified implementations, in which other components are added, are possible. For example, although FIG. 1 illustrates one terminal apparatus 100, it is conceivable that a plurality of terminal apparatuses 100 are connected to one electronic apparatus 200, as illustrated in FIG. 4, in the embodiment. In addition, modifications, such as omission or addition of the components, are possible as the same as in FIGS. 2 and 3 which will be described later.

The terminal apparatus 100 and the electronic apparatus 200 are possible to perform wireless communication. Here, the wireless communication is communication in conformity to a Wi-Fi standard and, more specifically, communication in conformity to a WFD standard. Specifically, one of the terminal apparatus 100 and the electronic apparatus 200 activates an internal access point (a software access point), and a remaining apparatus is connected to the internal access point. Meanwhile, although a WFD connection is described in in the embodiment, a configuration, in which the terminal apparatus 100 and the electronic apparatus 200 are capable of connecting to an external access point (for example, a wireless LAN router), respectively, is not inhibited.

FIG. 2 is a block diagram illustrating an example of a configuration of the terminal apparatus 100. The terminal apparatus 100 includes a processing unit 110 (a processor), a wireless communication unit 120 (a communication interface), a display unit 130 (a display), an operation unit 140 (an operation button or the like), a notification unit 150 (a notification interface), and a storage unit 160 (a memory).

The processing unit 110 (the processor or a controller) controls the respective units including the wireless communication unit 120, the display unit 130, the operation unit 140, the notification unit 150, and the storage unit 160.

It is possible for the processor (the processor including hardware) to realize each process (each function), which is performed by the processing unit 110, according to the embodiment. For example, it is possible to realize each process according to the embodiment using the processor which operates based on information, such as a program, and using the memory (a storage device) which stores the information such as the program. Here, the processor may cause, for example, functions of the respective units to be realized by individual hardware or the functions of the respective units to be realized by integrated hardware. For example, the processor includes hardware, and it is possible for the hardware to include at least one of a circuit which processes a digital signal and a circuit which processes an analog signal. For example, it is possible for the processor to include one or more circuit devices (for example, ICs or the like), which are mounted on a circuit substrate, or one or more circuit elements (for example, a resistor, a capacitor, and the like). The processor may be, for example, a CPU. However, the processor is not limited to the CPU, and it is possible to use various processors such as a Graphics Processing Unit (GPU) and a Digital Signal Processor (DSP). In addition, the processor may be a hardware circuit using ASIC. In addition, the processor may include a plurality of CPUs, or may include a hardware circuit using a plurality of ASICs. In addition, the processor may include a combination of the plurality of CPUs and the hardware circuit using the plurality of ASICs.

The wireless communication unit 120 is realized by at least one communication device (a wireless communication device). The wireless communication unit 120 includes the wireless communication device (a wireless communication chip) which performs the wireless communication in conformity to the Wi-Fi standard. However, the wireless communication unit 120 may include a wireless communication device which performs the wireless communication in conformity to a standard other than the Wi-Fi standard. The standard other than the Wi-Fi standard may be, for example, Bluetooth (registered trademark) or, in a narrow sense, Bluetooth Low Energy (BLE).

The display unit 130 includes a display or the like, which displays various pieces of information to a user, and the operation unit 140 includes a button or the like which receives an input operation from the user. Meanwhile, the display unit 130 and the operation unit 140 may be formed integrally by, for example, a touch panel. The notification unit 150 provides a notification with respect to the user. The notification unit 150 may be, for example, a speaker which provides a notification using sounds, a vibration unit (a vibration motor) which provides a notification using vibration, or a combination thereof.

The storage unit 160 (the storage device or the memory) stores various pieces of information such as the data or the program. The processing unit 110 and the wireless communication unit 120 operate while using, for example, the storage unit 160 as a work area. The storage unit 160 may be a semiconductor memory, such as an SRAM or a DRAM, may be a register, may be a magnetic storage device such as a Hard Disk Device (HDD), or may be an optical storage device such as an optical disk device. For example, the storage unit 160 stores a computer-readable command. In a case where the command is executed by the processing unit 110 (processor), the function of each of the units (the communication unit and the processing unit) of the terminal apparatus 100 is realized. Here, the command may be a command of a command set which forms the program, or may be a command which instructs an operation with respect to the hardware circuit of the processing unit 110 (processor). In addition, the terminal apparatus 100 includes an imaging unit (camera) which is not illustrated in the drawing, and the storage unit 160 stores image data (including a still image and a moving picture) which is imaged by the imaging unit.

FIG. 3 is a block diagram illustrating an example of a configuration of the electronic apparatus 200. Meanwhile, FIG. 3 illustrates the electronic apparatus 200 (printer) which has a print function. In the description below, an example in which the electronic apparatus 200 is a printer will be described. However, a fact that it is possible to extend the electronic apparatus 200 to an apparatus other than the printer is as described above. The electronic apparatus 200 includes a processing unit 210 (a processor), a wireless communication unit 220 (a communication interface), a display unit 230 (a display), an operation unit 240 (an operation panel), a print unit 250, and a storage unit 260 (a memory).

The processing unit 210 (a processor or a controller) controls each of the units (the wireless communication unit, the storage unit, the print unit or the like) of the electronic apparatus 200, or performs various processes according to the embodiment. For example, it is possible for the processing unit 210 to include a plurality of CPUs (an MPU and a microcomputer) such as a main CPU and a sub CPU. The main CPU (a main control substrate) controls each of the units or the whole units of the electronic apparatus 200. For example, in a case where the electronic apparatus 200 is the printer, the sub CPU performs various processes for print. Otherwise, a CPU for the communication process may be further provided.

The wireless communication unit 220 is realized by at least one communication device (a wireless communication device). The wireless communication unit 220 includes a wireless communication device (a wireless communication chip) which performs the wireless communication in conformity to the Wi-Fi standard. However, the wireless communication unit 220 may include a wireless communication device which performs the wireless communication in conformity to a standard other than the Wi-Fi standard.

The display unit 230 includes a display or the like which displays various pieces of information to the user, and the operation unit 240 includes a button or the like which receives an input operation from the user. Meanwhile, the display unit 230 and the operation unit 240 may be formed integrally by, for example, the touch panel.

The print unit 250 includes a print engine. The print engine has a mechanical configuration used to print an image on a print medium. For example, the print engine includes a transfer mechanism, an ink jet-type discharge head, a carriage drive mechanism which includes the discharge head, and the like. The print engine discharges ink from the discharge head with respect to the print medium (paper or cloth) which is transported by the transfer mechanism, thereby printing an image on the print medium. Meanwhile, a detailed configuration of the print engine is not limited to the example illustrated here, and the print may be performed with toner using a laser method. In addition, the print unit 250 may include a sensor which detects various physical quantities relevant to a work state of the print engine, a counter which counts a result of the detection, and the like. In a case where the sensor and the counter are used, it is possible to acquire, for example, pieces of information such as a drive quantity of the transfer mechanism (a rotation quantity of the motor), the number of times of reciprocation of the discharge head, and the amount of ink consumption.

The storage unit 260 (the storage device or the memory) stores various pieces of information such as the data and the program. The processing unit 210 and the wireless communication unit 220 operate while using, for example, the storage unit 260 as a work area. The storage unit 260 may be a semiconductor memory, a register, a magnetic storage device, or an optical storage device. The storage unit 260 stores data, which is output from the print unit 250, as information which indicates a work situation of the printer.

In addition, the storage unit 260 (store device) may store data which is transmitted from the terminal apparatus 100 through the wireless communication. Here, the data is, for example, print data which is used for print in the print unit 250. However, the storage of the data from the terminal apparatus 100 is not limited to the storage performed in the storage unit 260 which is embedded in the electronic apparatus 200. For example, the electronic apparatus 200 may include an interface which is not illustrated in the drawing, and the data from the terminal apparatus 100 may be stored in an external storage device which is connected through the interface. The external storage device may be, for example, an HDD, an Solid State Drive (SSD), and a flash memory which are connected through a Universal Serial Bus (USB), may be an SD card (including a storage device in conformity to a standard relevant to a micro SD card or the like) which is inserted into a card slot, or may be another storage device which is capable of connecting to the electronic apparatus 200.

2. FIRST EMBODIMENT

FIG. 4 is a schematic diagram illustrating a connection state which is conceivable in the embodiment. The electronic apparatus 200 is wirelessly connected to N terminal apparatuses 100 (existing connection terminals 400) through the internal access point which is activated by the wireless communication unit 220. Hereinafter, the internal access point, which is used for connection with the existing connection terminals 400, is expressed as a first internal access point. Here, N is a value which is equal to or larger than 1, that is, a value which is equal to or smaller than an upper limit number of the WFD connection. Although the upper limit number of the WFD connection is, for example, 4, the upper limit number may be another value.

The wireless communication according to the embodiment is Wi-Fi Direct (WFD)-type communication. That is, the first internal access point is an access point for the WFD connection. The first internal access point (selectively) operates while switching between a first frequency band and a second frequency band. Since the Wi-Fi standard is conceivable, the first frequency band is a band of 2.4 GHz, and the second frequency band is a band of 5 GHz. Specifically, the band of 2.4 GHz corresponds to a standard such as IEEE 802.11b, IEEE 802.11g, or IEEE 802.11n, and the band of 5 GHz corresponds to a standard such as IEEE 802.11a, IEEE 802.11n, or IEEE 802.11ac. However, an extension of the wireless communication according to the embodiment to a standard which is different from the Wi-Fi standard is not inhibited. In addition, here, the internal access point (the first internal access point and a second internal access point, which will be described later) is an access point which is activated by any one of the wireless communication units of two apparatuses (the terminal apparatus 100 and the electronic apparatus 200) which are directly connected, and is an access point which is different from the external access point activated by an external device (for example, a wireless LAN router) other than the apparatuses. In the embodiment, the first internal access point and the second internal access point are activated by the wireless communication unit 220 of the electronic apparatus 200.

In FIG. 4, it is assumed that the whole N existing connection terminals 400 are apparatuses corresponding to the band of 5 GHz. In this case, the electronic apparatus 200 sets the operation frequency band of the first internal access point to 5 GHz, and performs the wireless communication. Therefore, it is possible for the existing connection terminal 400 to directly connect to the electronic apparatus 200 without passing through the external access point. Meanwhile, in the Wi-Fi standard, a communication speed is fast in the band of 5 GHz, compared to the band of 2.4 GHz. Furthermore, there is a high possibility that an apparatus corresponding to the band of 5 GHz also corresponds to the band of 2.4 GHz. Therefore, in a typical use case, the whole N existing connection terminals 400 correspond to both 2.4 GHz and 5 GHz, and a situation is generated in which the operation frequency band of the first internal access point is set to the band of 5 GHz by taking a communication speed into consideration.

In the situation, it is assumed that an operation of connecting the terminal apparatus 100, which is not wirelessly connected to the electronic apparatus 200 by that time, to the electronic apparatus 200 is performed. Hereinafter, in order to distinguish the terminal apparatus 100 whose connection is newly started from the existing connection terminal 400, the terminal apparatus 100 is expressed as a new connection terminal 300.

In a case where the new connection terminal 300 corresponds to both the band of 2.4 GHz and the band of 5 GHz, it is possible to realize the connection between the new connection terminal 300 and the electronic apparatus 200 by adopting the band to the operation frequency band (in the above example, the band of 5 GHz) used in the electronic apparatus 200. However, in a case where the new connection terminal 300 includes only 2.4 GHz as a wireless capability and does not correspond to 5 GHz, there is a problem in that it is not possible for the new connection terminal 300 to wirelessly connect to the electronic apparatus 200 even in a case where the electronic apparatus 200 provides a WFD function at 5 GHz. In the embodiment, it is conceivable that the number of Wi-Fi chips of the electronic apparatus 200 is one, and thus it is not possible to simultaneously provide the WFD function of the band of 2.4 GHz in a case where the WFD function of the band of 5 GHz is provided.

In above view, the operation frequency band is dynamically switched according to the wireless capability of the terminal apparatus 100 (new connection terminal 300) in the embodiment. As illustrated in FIG. 3, the electronic apparatus 200 according to the embodiment includes the wireless communication unit 220, and the processing unit 210 that controls communication of the wireless communication unit 220. The wireless communication unit 220 performs a first wireless communication process using the internal access point (first internal access point), which operates in the first frequency band (the band of 2.4 GHz) or the second frequency band (the band of 5 GHz) different from the first frequency band, of the electronic apparatus 200, and a second wireless communication process different from the first wireless communication process. Furthermore, in a case where a connection demand with respect to the first internal access point is provided, the wireless communication unit 220 transmits information of the operation frequency band of the first internal access point on demand with respect to the terminal apparatus 100 through the second wireless communication process. In a case where the wireless communication unit 220 receives a demand to change the operation frequency band into the first frequency band from the terminal apparatus 100, the processing unit 210 performs a process of changing the operation frequency band of the first internal access point from the second frequency band to the first frequency band.

Here, the first wireless communication process is a wireless communication process using the first internal access point which is selectively operated by at least two operation frequency bands. In the first wireless communication process, for example, information stored in the terminal apparatus 100 is received for the process in the electronic apparatus 200. In the case where the electronic apparatus 200 is the printer, the first wireless communication process is a communication process of receiving print data from the terminal apparatus 100.

In contrast, the second wireless communication process is a wireless communication process without using the first internal access point. As described in the embodiment, the second wireless communication process may be a wireless communication process using the second internal access point which is different from the first internal access point or may be a process of performing communication in conformity to a Bluetooth standard which will be described later as a second embodiment. In addition, the second wireless communication process may be considered as a temporary connection communication process of transmitting and receiving information used to perform the first wireless communication process between the electronic apparatus 200 and the terminal apparatus 100 (new connection terminal 300).

In addition, "a case where the connection demand with respect to the internal access point (the first internal access point) is provided" indicates a case where a process of attempting connection to an apparatus, which is different from the existing connection terminal 400, is started using the first internal access point in the electronic apparatus 200. For example, the case corresponds to a case where a series of temporary connection processes, which will be described later, are started. As will be described with reference to FIG. 5, in a case where it is considered that a trigger for starting the temporary connection is an operation performed by the user, "the case where the connection demand with respect to the internal access point is provided" may express a case where the user operation which instructs the temporary connection is performed.

In a method according to the embodiment, before the wireless connection (the WFD connection) for the first wireless communication process is established, the information of the operation frequency band of the first internal access point is transmitted to the terminal apparatus 100 (the new connection terminal 300). It is apparent that a side of the terminal apparatus 100 apparently grasps the wireless capability (whether to correspond to the first frequency band or the second frequency band) of the terminal apparatus 100. That is, in a case where the information of the operation frequency band of the first internal access point on the connection demand is transmitted to the terminal apparatus 100, it is possible to cause the side of the terminal apparatus 100 to determine whether or not it is possible to perform the wireless communication in the operation frequency band. In a case where it is not possible to perform the wireless communication in the operation frequency band as it is, an operation frequency band change demand is provided from the terminal apparatus 100. Therefore, the operation frequency band of the first internal access point is changed according to the change demand. In this manner, it is possible to dynamically change the operation frequency band of the first internal access point according to the wireless capability of the terminal apparatus 100, and thus it is possible to appropriately perform wireless connection to the terminal apparatus 100 (new connection terminal 300).

Further, in the embodiment, the information of the operation frequency band of the first internal access point is transmitted to the terminal apparatus 100 through the second wireless communication process. As described above, depending on the operation frequency band, there is a problem in that it is not possible to perform communication with the terminal apparatus 100 through the first wireless communication process, and thus it is unreasonable to attempt to realize communication for dynamic change in the operation frequency band through the first wireless communication process. Therefore, in the embodiment, the second wireless communication process, which is different from the first wireless communication process, is used. Here, in a case where the second wireless communication process is set as a communication process in a high availability aspect, it is possible to securely transmit the information of the operation frequency band to the terminal apparatus 100.

The second wireless communication process according to the embodiment is a wireless communication process using the second internal access point which operates in the first frequency band (the band of 2.4 GHz). Even in a case of the terminal apparatus 100 which does not correspond to the band of 5 GHz, a possibility corresponding to the band of 2.4 GHz is high. Therefore, in a case where the second wireless communication process is used, it is possible to securely transmit the information of the operation frequency band of the first internal access point.

The wireless communication unit 220 according to the embodiment performs both the first wireless communication process and the second wireless communication process using one wireless communication device (Wi-Fi chip). The first wireless communication process and the second wireless communication process are realized by switching an operation frequency of the wireless communication device and connection setting (SSID or password) in a software manner.

Meanwhile, the internal access point (first internal access point) and the second internal access point have different pieces of identification information (SSID). That is, in a case where the first internal access point operates in 2.4 GHz, the operation frequency band is the same as in the second internal access point. However, the SSID of the first internal access point (2.4 GHz) does not coincide with the SSID of the second internal access point. Naturally, the SSID of the first internal access point, which operates in the band of 5 GHz, does not coincide with the SSID of the second internal access point. Meanwhile, although the SSID of the first internal access point in a case where the operation is performed in the band of 2.4 GHz is described as the same as the SSID of the first internal access point in a case where the operation is performed in the band of 5 GHz, a configuration in which different SSIDs are used is not inhibited.

In addition, in the embodiment, for improvement of the convenience of the user, it is conceivable that the temporary connection is used. Here, the temporary connection is a connection used to transmit and receive connection information which is information used to establish the connection (the wireless connection used to perform the first wireless communication process), and transmission and reception of information other than the connection information is not conceivable. The connection information is information which includes identification information and password of a connection access point (first internal access point).

In a case where the temporary connection is not used, for example, in a case where the user selects the SSID of the first internal access point from an SSID list screen displayed on the display unit 130 of the terminal apparatus 100 after the first internal access point is activated by the electronic apparatus 200, the connection (the WFD connection) is performed between the terminal apparatus 100 and the electronic apparatus 200. However, an operation of opening the screen on which the SSID is displayed and an operation of selecting the SSID are complicated for the user who is not used to the operation of the terminal apparatus 100, thereby being short of convenience. In a case where the temporary connection is used, information, such as the SSID, is transmitted to the terminal apparatus 100 through the temporary connection, and thus an operation of selecting the SSID for the connection on the terminal apparatus 100 by the user is not necessary.

In a case where the temporary connection is used, the wireless communication unit 220 transmits the identification information and the password of the internal access point (the first internal access point) to the terminal apparatus 100 in the second wireless communication process. In this manner, it is possible to realize transmission of the information of the operation frequency band of the first internal access point and transmission of the SSID or the like of the first internal access point through the same wireless communication process. That is, it is possible to securely connect the terminal apparatus 100 and the electronic apparatus 200 through an effective communication sequence, and it is possible to improve the convenience of the user.

Figure 5:
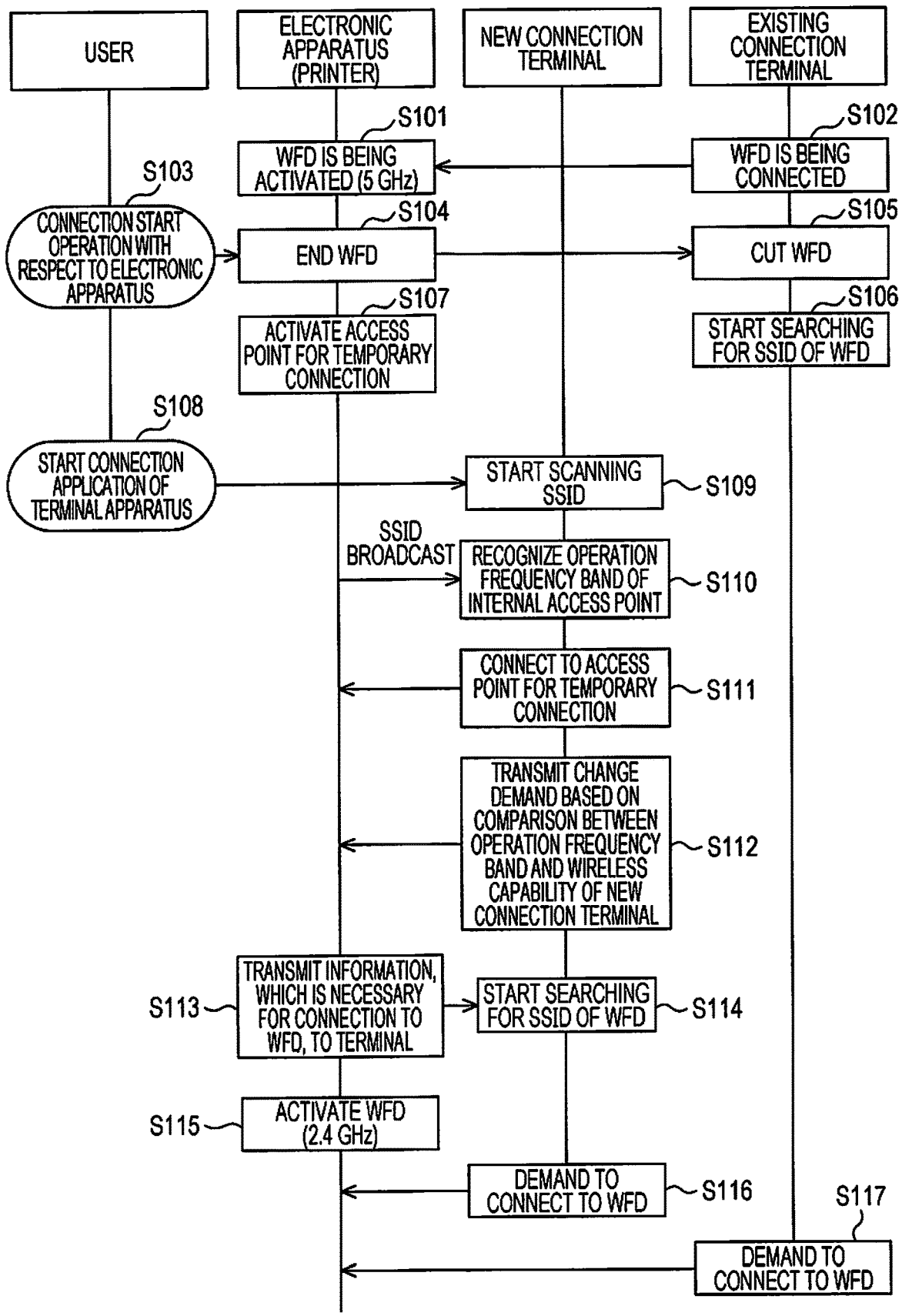
FIG. 5 is a sequence diagram illustrating a process according to a first embodiment.

FIG. 5 is a sequence diagram illustrating a process according to the embodiment. The electronic apparatus 200 is activating the WFD in the band of 5 GHz before starting connection to the terminal apparatus 100 (new connection terminal 300) (S101). Furthermore, one or more existing connection terminals 400 perform the WFD connection with respect to the first internal access point which is operating in the band of 5 GHz (S102).

In the case where the connection demand with respect to the first internal access point is provided, the wireless communication unit 220 stops the first internal access point, and activates the second internal access point for the temporary connection. Furthermore, the wireless communication unit 220 transmits the information of the operation frequency band of the first internal access point acquired before stopping the internal access point with respect to the terminal apparatus 100 through the second wireless communication process using the second internal access point.

Specifically, a connection start operation is performed by the user with respect to the electronic apparatus 200 as the connection demand with respect to the first internal access point (S103). The electronic apparatus 200 ends the activated WFD based on the operation in S103 (S104). In S104, the first internal access point is stopped. The WFD connection of the existing connection terminal 400 is cut together with the end of the WFD (S105), and each of the existing connection terminals 400 starts a process of searching for the SSID of the first internal access point (S106). In addition, the electronic apparatus 200 activates the second internal access point for the temporary connection (and for operation frequency band notification) after stopping the first internal access point (S107).

In the second wireless communication process, the wireless communication unit 220 transmits the information of the operation frequency band of the first internal access point acquired before stopping the internal access point with respect to the terminal apparatus 100 using a beacon signal in conformity to the Wi-Fi standard. For example, in a case where the operation frequency of the first internal access point is in the band of 5 GHz, the SSID is set to "xxx-5G". In a case where the operation frequency of the first internal access point is the band of 2.4 GHz, the SSID is set to "xxx-2.4G". Here, "xxx" is a string which has a number of characters that is equal to or smaller than a predetermined number of characters, that is, an arbitrary string excluding characters which are not possible to be used as a name of the SSID.

In addition, with regard to the connection demand with respect to the first internal access point, the connection start operation is also performed by the user with respect to the terminal apparatus 100 (the new connection terminal 300). Specifically, the user performs an operation of starting connection application software which is previously installed in the new connection terminal 300 (S108).

Information (the SSID or the like) used for connection to the second internal access point for the temporary connection is previously included in the connection application software. In the above example, the connection application software previously holds information in which the SSID of the second internal access point is "xxx-2.4G" or "xxx-5G" and a final numerical value changes according to an immediately preceding operation frequency band of the first internal access point.

In a case where the processing unit 110 of the new connection terminal 300 operates according to the connection application software, scanning of the SSID of the second internal access point starts (S109). In a case where the SSID of the second access point is found, the new connection terminal 300 recognizes the operation frequency band of the first internal access point depending on whether the found SSID is "xxx-2.4G" or "xxx-5G" (S110), and performs the temporary connection to the second internal access point (S111).

Meanwhile, as being understood from the above description, in the embodiment, the SSID, acquired in the case where the operation frequency band of the first internal access point is the band of 2.4 GHz, and the SSID, acquired in the case where the operation frequency band of the first internal access point is the band of 5 GHz, may be identified by the terminal apparatus 100 (the connection application software). Therefore, in a case where it is possible to share association between the name of the SSID and the operation frequency band between the electronic apparatus 200 and the terminal apparatus 100, detailed strings of the SSID are not limited to "xxx-2.4G" and "xxx-5G", and various modified implementations are possible.

The new connection terminal 300 compares the operation frequency band of the first internal access point recognized in S110 with the wireless capability of the new connection terminal 300. Furthermore, in a case where it is not possible to perform connection as it is, specifically, in a case where the wireless capability of the new connection terminal 300 is only the band of 2.4 GHz and the operation frequency band of the first internal access point is the band of 5 GHz, the new connection terminal 300 transmits an operation frequency band change demand to the electronic apparatus 200 (S112).

Meanwhile, in a case where at least one existing connection terminal 400 includes a device corresponding to only the band of 2.4 GHz, the WFD connection of S101 and S102 is performed in the band of 2.4 GHz. In this case, even though the wireless capability of the new connection terminal 300 is only the band of 2.4 GHz, it is possible for the new connection terminal 300 to connect to the first internal access point in the operation frequency band as it is, and thus it is not necessary to transmit the change demand. Otherwise, as in a modification example which will be described later, the change demand (operation demand in the band of 2.4 GHz) may be transmitted in this case.

The electronic apparatus 200 transmits connection information, which is necessary for the connection, to the new connection terminal 300 (S113). In S113, the SSID and the password of the first internal access point are transmitted.

Since transmission and reception of information, which is necessary to perform the connection, are completed through the process in S113, the new connection terminal 300 cuts the wireless connection with the second internal access point for the temporary connection, and starts the process of searching for the SSID of the first internal access point using the information which is transmitted from the electronic apparatus 200 in S113 (S114).

In addition, the electronic apparatus 200 stops the second internal access point, and activates the first internal access point for the connection (for the WFD) (S115). In a case where the demand to change the operation frequency band into the first frequency band is received from the terminal apparatus 100 through the second wireless communication process, the processing unit 210 performs a process of changing the operation frequency band from the second frequency band into the first frequency band and reactivating the first internal access point. Specifically, in a case where the demand in S112 is provided, the WFD in 2.4 GHz is activated in S115.

The new connection terminal 300 starts searching for the SSID in S114. Therefore, in a case where the first internal access point is activated in S115, the SSID is found and connection with respect to the first internal access point is performed using the band of 2.4 GHz (S116).

In addition, the existing connection terminal 400 starts searching for the SSID in S106. Therefore, in a case where the first internal access point is activated in S115, the SSID is found and the connection with respect to the first internal access point is performed (S116). Since the existing connection terminal 400 corresponds to the band of 2.4 GHz, it is possible for the existing connection terminal 400 to connect to the WFD of the band of 2.4 GHz which is activated in S115. Meanwhile, here, an example is illustrated in which the SSID of the first internal access point is the same in both the band of 2.4 GHz and the band of 5 GHz. Therefore, it is possible for the existing connection terminal 400 to use the same SSID (and password) in both S102 and S116. However, in a case where the SSID of the first internal access point changes according to the operation frequency band and the existing connection terminal 400 holds both the SSIDs, the connections in S102 and S116 may be performed.

Meanwhile, FIG. 5 illustrates an example in which the information of the operation frequency band is transmitted using the beacon signal in conformity to the Wi-Fi standard. Here, the beacon signal is a signal which is transmitted using the wireless communication and is a signal which is used to acquire information, such as a location, and is used to check existence of a device. The beacon signal is transmitted in a state in which a transmission destination is not specified and is received by a reception terminal which exists within a range. Although the beacon signal according to the first embodiment is a broadcast signal (SSID broadcast), it is possible to extend a term itself of the beacon signal to a signal in conformity to another communication standard. For example, an advertise packet in conformity to a Bluetooth communication standard, which will be described in a second embodiment, is also the beacon signal.

However, in the embodiment, in the second wireless communication process, transmission of the SSID and the password for the connection is performed. That is, in the second wireless communication process, connection is established between the electronic apparatus 200 and the terminal apparatus 100 using the second internal access point, and thus it is possible to transmit and receive arbitrary information through the connection. Therefore, the information of the operation frequency band of the first internal access point may be transmitted to the terminal apparatus 100 after connection of the terminal apparatus 100 with respect to the second internal access point is established. For example, the information of the operation frequency band is not broadcasted and is transmitted at timing of S113.

In addition, it is possible to apply the method according to the embodiment to the terminal apparatus 100 (the new connection terminal 300) which performs the wireless communication with the electronic apparatus 200. The terminal apparatus 100 includes the wireless communication unit 120 which performs the wireless communication using the first frequency band, and the processing unit 110 which controls the communication of the wireless communication unit 120. In a case where the processing unit 110 receives the information of the operation frequency band of the internal access point (the first internal access point) of the electronic apparatus 200 from the electronic apparatus 200, the processing unit 110 determines whether or not the operation frequency band of the first internal access point is the first frequency band. Furthermore, in a case where the processing unit 110 determines that the operation frequency band of the first internal access point is not the first frequency band, the wireless communication unit 120 transmits the demand to change the operation frequency band of the first internal access point into the first frequency band to the electronic apparatus 200 (S112 of FIG. 5).

3. SECOND EMBODIMENT

In the first embodiment, notification of the operation frequency band and transmission of the information for the connection are performed with respect to a terminal apparatus 100 using a wireless communication device which is the same as the wireless communication device (the Wi-Fi chip) that performs the connection. Specifically, in a case where the first internal access point of the band of 2.4 GHz, the first internal access point of the band of 5 GHz, and the second internal access point of the band of 2.4 GHz are activated after being appropriately switched, the first wireless communication process and the second wireless communication process are realized. In a case where it is conceivable that only one Wi-Fi chip is mounted on the electronic apparatus 200 due to a cost relation or the like, it is possible to use the same Wi-Fi chip for the notification of the operation frequency band, and thus it is possible to realize a desired process with an efficient configuration.

A configuration which includes a plurality of wireless communication devices (including two or more Wi-Fi chips) in conformity to the same communication standard is surplus and a reward with respect to the cost is small. In contrast, it may be sufficiently considered that the electronic apparatus 200, such as the printer, includes a plurality of wireless communication devices in conformity to different communication standards, respectively. The reason for this is that such a configuration has a large advantage in that it is possible to perform communication in conformity to various communication standards.

The wireless communication unit 220 according to the embodiment includes the plurality of wireless communication devices, performs the first wireless communication process using the first wireless communication device, and performs the second wireless communication process using the second wireless communication device. Here, the first wireless communication device is a device which performs the communication in conformity to the Wi-Fi communication standard, and the second wireless communication device is a device which performs the communication in conformity to the Bluetooth communication standard. Meanwhile, the Bluetooth communication standard is a Bluetooth Low Energy (BLE) communication standard in a narrow sense.

Figure 6:
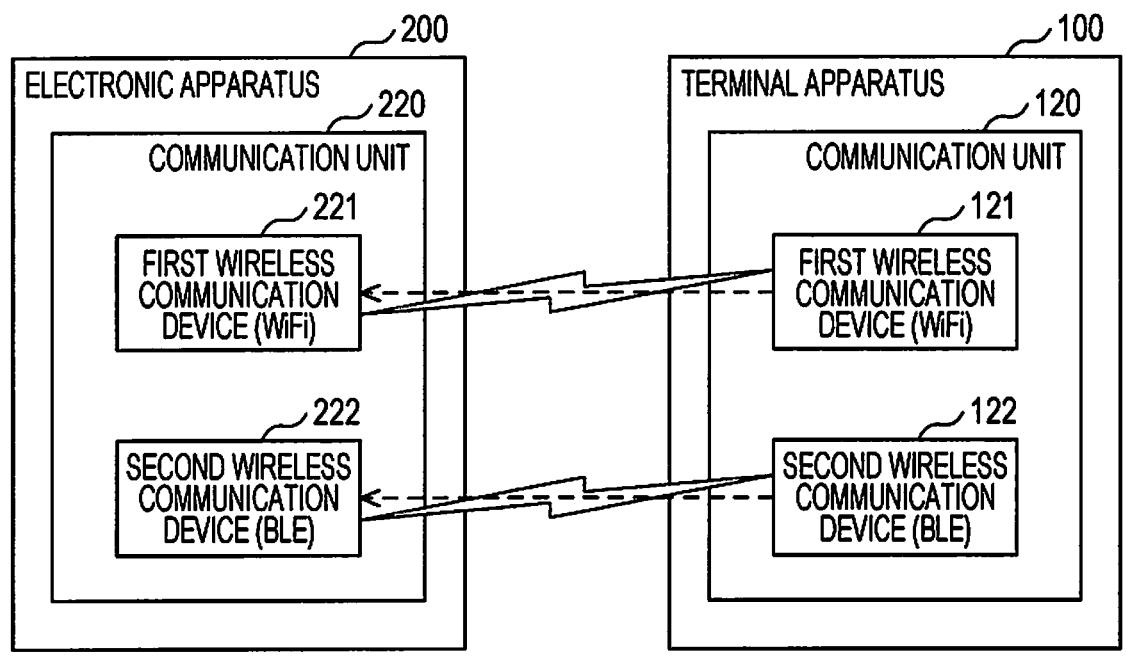
FIG. 6 is a schematic diagram illustrating a wireless communication process according to a second embodiment.

FIG. 6 is a schematic diagram illustrating a configuration of the wireless communication unit 120 of the terminal apparatus 100 and the wireless communication unit 220 of the electronic apparatus 200. As illustrated in FIG. 6, the wireless communication unit 120 of the terminal apparatus 100 includes a first wireless communication device 121 (a Wi-Fi chip or a Wi-Fi module) which performs the communication in conformity to the Wi-Fi standard, and a second wireless communication device 122 (a BLE chip or a BLE module) which performs the communication in conformity to the BLE standard. In the same manner, the wireless communication unit 220 of the electronic apparatus 200 includes a first wireless communication device 221 which performs the communication in conformity to the Wi-Fi standard, and a second wireless communication device 222 which performs the communication in conformity to the BLE standard. The first wireless communication process is performed between the first wireless communication devices 121 and 221, and the second wireless communication process is performed between the second wireless communication devices 122 and 222.

Figure 7:
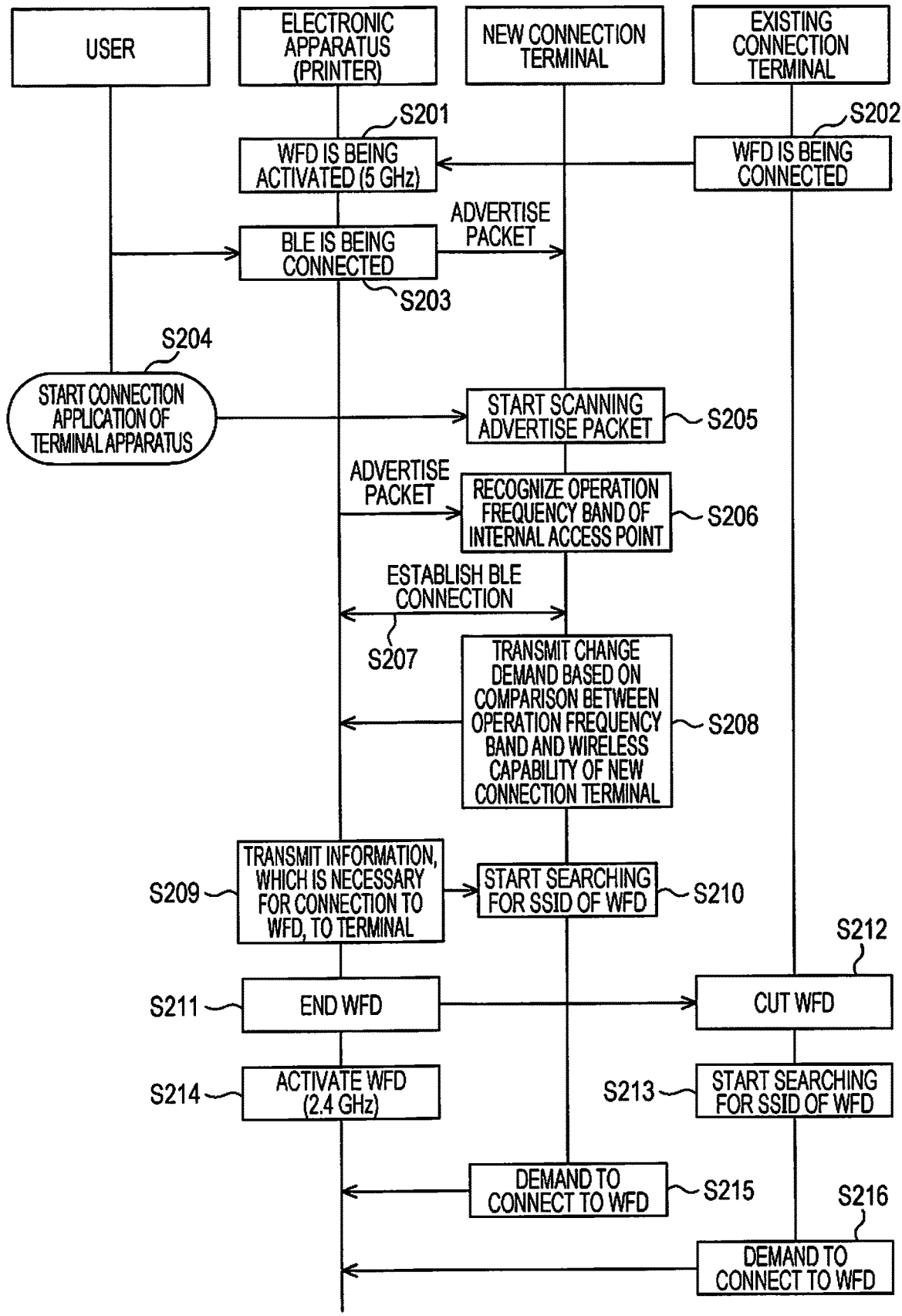
FIG. 7 is a sequence diagram illustrating a process according to the second embodiment.

FIG. 7 is a sequence diagram illustrating a process according to the embodiment. S201 and S202 are the same as S101 and S102 of FIG. 5. The electronic apparatus 200 is activating the second wireless communication device 222, and periodically transmits the beacon signal (S203). Here, the beacon signal is an advertise packet. The advertise packet in conformity to the BLE standard includes payload of a prescribed size (for example, 31 bytes). The electronic apparatus 200 transmits the advertise packet which includes information of the operation frequency band of the first internal access point.

Before a connection demand with respect to the first internal access point is provided, scan is not performed in the new connection terminal 300. Therefore, even though the new connection terminal 300 exists in a location where it is possible to receive the advertise packet, a response with respect to the advertise packet is not provided.

In contrast, in a case where the connection demand with respect to the first internal access point starts, the connection start operation is performed with respect to the terminal apparatus 100 (new connection terminal 300) by the user. Specifically, the user performs an operation of starting connection application software which is previously installed in the new connection terminal 300 (S204).

In a case where the processing unit 110 of the new connection terminal 300 performs an operation according to the connection application software, the processing unit 110 activates the second wireless communication device 122, and starts scanning the advertise packet (S205). In a case where the new connection terminal 300 refers to a prescribed area of the advertise packet, the new connection terminal 300 recognizes the operation frequency band of the first internal access point (S206). In addition, BLE connection is established between the new connection terminal 300 and the electronic apparatus 200 (S207). Here, the establishment of the connection corresponds to execution of pairing and bonding.

The new connection terminal 300 compares the operation frequency band of the first internal access point, which is recognized in S206, with the wireless capability of the new connection terminal 300. Furthermore, in a case where it is not possible to perform connection as it is, the operation frequency band change demand is transmitted to the electronic apparatus 200 using the BLE connection established in S207 (S208). In addition, the electronic apparatus 200 transmits connection information, which is necessary for the connection, to the new connection terminal 300 using the BLE connection established in S207 (S209). In S209, the SSID and the password of the first internal access point are transmitted.

Since transmission and reception of the information, which is necessary to perform the connection, are completed through the process in S209, the new connection terminal 300 starts the process of searching for the SSID of the first internal access point using the information which is transmitted from the electronic apparatus 200 in S209 (S210).

In a case where the operation frequency band change demand is transmitted in S208, the electronic apparatus 200 ends the WFD of the band of 5 GHz which is being activated in S201 (S211). With the end of the WFD, the WFD connection is cut in the existing connection terminal 400 (S212), and each existing connection terminal 400 starts the process of searching for the SSID of the first internal access point (S213).

After the process of S210, the electronic apparatus 200 activates the WFD of the band of 2.4 GHz (reactivates the first internal access point in the band of 2.4 GHz) (S214).

The new connection terminal 300 starts searching for the SSID in S210. Therefore, in a case where the first internal access point is activated in S214, the SSID is found, and connection is performed with respect to the first internal access point using the band of 2.4 GHz (S215). In addition, the existing connection terminal 400 starts searching for the SSID in S213. Therefore, in a case where the first internal access point is activated in S214, the SSID is found, and connection is performed with respect to the first internal access point (S216).

As described above, the second wireless communication process according to the embodiment is a wireless communication process in conformity to the Bluetooth communication standard, and the wireless communication unit 220 transmits the information of the operation frequency band of the internal access point (first internal access point) to the terminal apparatus 100 using the beacon signal (advertise packet) in conformity to the Bluetooth communication standard. Furthermore, in a case where the processing unit 210 receives the demand to change the operation frequency band into the first frequency band from the terminal apparatus 100 through the second wireless communication process, the processing unit 210 changes the operation frequency band from the second frequency band into the first frequency band.

In this manner, it is possible to transmit the information of the operation frequency band and the connection information through the wireless communication process in conformity to the Bluetooth standard.

As illustrated in S211 and S214 of FIG. 7, after the processing unit 210 receives the demand to change the operation frequency band into the first frequency band from the terminal apparatus 100, the processing unit 210 performs a process of stopping the internal access point (first internal access point) and reactivating the first internal access point using the first frequency band. In other words, compared to the first embodiment, the embodiment has an advantage in that it is possible to continue the operation (WFD which is being activated in S101) of the first internal access point until immediately before the operation frequency band change demand is received. In a case where the operation frequency band change demand does not exist (in a case where the WFD of the band of 2.4 GHz is originally activated), it is possible to maintain the connection of the new connection terminal 300 without cutting the WFD connection with the existing connection terminal 400. The reason for this is that it is possible to independently perform the first wireless communication process and the second wireless communication process using different wireless communication devices.

Meanwhile, although FIG. 7 illustrates an example in which the beacon signal (advertise packet) of the BLE is regularly transmitted, the invention is not limited thereto. For example, similar to the first embodiment, the connection start operation is performed with respect to the electronic apparatus 200 by the user as the connection demand with respect to the first internal access point, and transmission of the beacon signal may be started based on the operation. In this case, after the completion of the temporary connection (for example, after reactivating S213), a process of stopping the transmission of the beacon signal is performed. In addition, although FIG. 7 illustrates an example in which the advertise packet includes the information of the operation frequency band, the transmission of the information of the operation frequency band may be performed using a packet (a data packet) which is transmitted after establishing the connection in S207.

4. MODIFICATION EXAMPLE

In the above-described first embodiment and the second embodiment, a method for changing the operation frequency band of the first internal access point from the second frequency band (the band of 5 GHz) into the first frequency band (the band of 2.4 GHz) is described. However, as described above, in the Wi-Fi standard, it is desired to set the operation frequency to the band of 5 GHz in a situation in which the band of 5 GHz has a faster communication speed than 2.4 GHz and it is possible to use the band of 5 GHz.

Here, in a modification example, in a case where the connection between the terminal apparatus 100 (new connection terminal 300), which provides the demand to change the operation frequency band, and the first internal access point is cut, the processing unit 210 performs a process of returning the operation frequency band of the first internal access point from the first frequency band (the band of 2.4 GHz) to the second frequency band (the band of 5 GHz).

It is possible to assume that the existing connection terminal 400, which is originally connected to the electronic apparatus 200 in the band of 5 GHz, selects 5 GHz as the operation frequency band because the communication speed is faster in the band of 5 GHz. In a case where the new connection terminal 300, which demands the WFD in 2.4 GHz, is cut, the communication speed between the existing connection terminal 400 and the electronic apparatus 200 increases if the operation frequency band of the first internal access point is returned to the band of 5 GHz and the existing connection terminal 400 is connected to the electronic apparatus 200 in the band of 5 GHz. The increased speed is advantageous to the user who possesses the existing connection terminal 400.

Meanwhile, in a case where the process is performed, it is necessary for the electronic apparatus 200 to determine whether or not the terminal whose wireless connection is cut is a new terminal which demands the WFD connection in the band of 2.4 GHz.

Accordingly, the processing unit 210 determines whether or not the terminal apparatus 100 whose connection to the first internal access point is cut is the terminal apparatus 100 (new connection terminal 300), which demands the change of the operation frequency band, based on the identification information of the terminal apparatus 100.

In the example of FIG. 5, in a case where the new connection terminal 300 is connected to the second internal access point in S112, an MAC address of the new connection terminal 300 is stored in a prescribed area of the storage unit 260. Furthermore, the processing unit 210 compares an MAC address of the terminal apparatus 100 whose connection to the first internal access point is cut with the MAC address stored in the storage unit 260, and determines whether or not the terminal apparatus 100 whose connection is cut is the terminal apparatus 100 (new connection terminal 300) which demands the change of the operation frequency band. Meanwhile, the identification information may be information, which is capable of uniquely specifying the terminal apparatus 100, and information other than the MAC address may be used.

Meanwhile, in order to return the operation frequency band of the first internal access point from the band of 2.4 GHz to the band of 5 GHz, it is necessary that the whole terminal apparatus 100 corresponding to only the band of 2.4 GHz is cut from the first internal access point. For example, after the processes of FIG. 5 or 7, specifically, a case where the new connection terminal 300 (hereinafter, the second new connection terminal) corresponding to only the band of 2.4 GHz further provides a connection demand may be considered in a situation in which the existing connection terminal 400 corresponding to 5 GHz and the new connection terminal 300 corresponding to only the band of 2.4 GHz are connected to the first internal access point which operates in the band of 2.4 GHz. In this case, since the operation frequency band of the first internal access point is the band of 2.4 GHz, it is possible to connect the second new connection terminal to the first internal access point without providing the operation frequency band change demand. However, in order to return the operation frequency band of the first internal access point from the band of 2.4 GHz to the band of 5 GHz, it is desired to make a condition that both the new connection terminal 300 and the second new connection terminal are cut. In a case where the operation frequency band is returned to the band of 5 GHz while only the new connection terminal 300 is cut, the connection of the second new connection terminal is also cut.

Accordingly, in a case where the modification example is considered, it is desired for the new connection terminal 300 to transmit the change demand into the band of 2.4 GHz (operation demand in the band of 2.4 GHz with respect to the first internal access point) in the process of S112 regardless that the operation frequency band of the first internal access point is the band of 2.4 GHz or the band of 5 GHz. In this manner, in the electronic apparatus 200, it is possible to receive the change demand from the whole terminal apparatus 100 corresponding to only the band of 2.4 GHz. As a result, in a case where connection to the whole terminal apparatus 100 which demands to change the operation frequency band is cut, it is possible to realize a process of returning the operation frequency band of the first internal access point to the band of 5 GHz.

In addition, it is possible to apply the method according to the embodiment to the communication system 10, which includes the electronic apparatus 200 and the new connection terminal 300 (terminal apparatus 100) as illustrated in FIG. 1, and the wireless communication method using the communication system.

The wireless communication method according to the embodiment is a wireless communication method using the electronic apparatus 200 that performs the wireless communication using the internal access point (first internal access point), which operates in the first frequency band or the second frequency band different from the first frequency band, of the electronic apparatus 200, and the terminal apparatus 100 (new connection terminal 300) that performs the wireless communication using the first frequency band. In the wireless communication method, the following process is performed. In a case where the connection demand with respect to the first internal access point is provided, the electronic apparatus 200 transmits the information of the operation frequency band of the first internal access point on demand with respect to the terminal apparatus 100. Furthermore, the terminal apparatus 100 receives the information of the operation frequency band of the first internal access point of the electronic apparatus 200 from the electronic apparatus 200, and determines whether or not the operation frequency band of the first internal access point is the first frequency band. In a case where it is determined that the operation frequency band of the first internal access point is not the first frequency band, the terminal apparatus 100 transmits the demand to change the operation frequency band of the first internal access point into the first frequency band to the electronic apparatus 200. In a case where the demand is received, the electronic apparatus 200 changes the operation frequency band of the first internal access point from the second frequency band into the first frequency band.

In addition, the terminal apparatus 100 (new connection terminal 300) and the electronic apparatus 200 according to the embodiment may realize a part or most of the process using a program. In this case, in a case where a processor, such as a CPU, executes the program, the terminal apparatus 100 or the like according to the embodiment is realized. Specifically, a program, which is stored in a non-temporary information store medium, is read, and the read program is executed by the processor such as the CPU. Here, an information storage medium (computer-readable medium) stores a program, data, and the like, and it is possible to realize a function thereof is realized by an optical disk (a DVD, a CD, or the like), a Hard Disk Drive (HDD), a memory (a card-type memory, a ROM, or the like), or the like. Furthermore, the processor, such as the CPU, performs the various processes according to the embodiment based on the program (data) stored in the information storage medium. That is, the information storage medium stores a program (a program used to cause a computer to perform the processes of the respective units) used to cause the computer (a device which includes an operation unit, a processing unit, a storage unit, and an output unit) to function as the respective units according to the embodiment.

For example, the program according to the embodiment is a program that operates the electronic apparatus 200 including the wireless communication unit 220, which performs the wireless communication using internal access point (first internal access point), which operates in the first frequency band or the second frequency band different from the first frequency band, of the electronic apparatus 200, and the terminal apparatus 100 which performs the wireless communication. The program causes the computer (terminal apparatus 100) to function as the wireless communication unit 120, which performs the wireless communication using the first frequency band, and the processing unit 110 which controls communication of the wireless communication unit 120. In a case where the processing unit 110 receives the information of the operation frequency band of the first internal access point of the electronic apparatus 200 from the electronic apparatus 200, the processing unit 110 determines whether or not the operation frequency band of the first internal access point is the first frequency band. In a case where the processing unit 110 determines that the operation frequency band of the first internal access point is not the first frequency band, the wireless communication unit 120 transmits the demand to change the operation frequency band of the first internal access point into the first frequency band to the electronic apparatus 200.

Hereinabove, the embodiments, to which the invention is applied, and the modification example thereof are described. However, the invention is not limited to each of the embodiments and the modification example at it is, and it is possible to modify and specify components in a range without departing from the gist of the invention in execution steps. In addition, in a case where the plurality of components, which are disclosed in each of the above-described embodiments and the modification example, are appropriately combined, it is possible to form various inventions. For example, some components may be removed from the whole components disclosed in each of the above-described embodiments and the modification example. Furthermore, the components described in the different embodiments and modification example may be appropriately combined. In addition, in the specification or the drawings, it is possible to replace terms, which are described together with further broader or synonymous different terms at least once, by the different terms in either the specification or the drawings. As above, various modifications and applications are possible in a range without departing from the gist of the invention.

The entire disclosure of Japanese Patent Application No. 2017-174697, filed Sep. 12, 2017 is expressly incorporated by reference herein.

What is claimed is:

1. An electronic apparatus comprising:
a wireless communication unit including at least one wireless communication chip, and configure to perform a first wireless communication process using an internal access point, and a second wireless communication process different from the first wireless communication process, the wireless communication unit is configured not to simultaneously use a first frequency band and a second frequency band different from the first frequency band during the first wireless communication process; and
a processor configured to control communication of the wireless communication unit,
wherein, in a case where a connection demand with respect to the internal access point is provided, the wireless communication unit transmits information of an operation frequency band of the internal access point on demand to a terminal apparatus through the second wireless communication process,
in a case where the terminal apparatus is capable of performing wireless communication using the first frequency band but not the second frequency band, and the operation frequency band indicated in the information is the second frequency band, and in a case where the wireless communication unit receives a demand to change the operation frequency band into the first frequency band from the terminal apparatus, the processor performs a process of changing the operation frequency band of the internal access point from the second frequency band into the first frequency band.

2. The electronic apparatus according to claim 1,
wherein the second wireless communication process is a wireless communication process in conformity to a Bluetooth communication standard,
wherein the wireless communication unit transmits information of the operation frequency band of the internal access point with respect to the terminal apparatus using a beacon signal in conformity to the Bluetooth communication standard in the second wireless communication process, and
wherein, in a case where the demand to change the operation frequency band into the first frequency band is received from the terminal apparatus through the second wireless communication process, the processor changes the operation frequency band from the second frequency band into the first frequency band.

3. The electronic apparatus according to claim 2,
wherein, after the demand to change the operation frequency band into the first frequency band is received from the terminal apparatus, the processor performs a process of stopping the internal access point and reactivating the internal access point using the first frequency band.

4. The electronic apparatus according to claim 1,
wherein, in a case where connection between the terminal apparatus, which demands to change the operation frequency band, and the internal access point is cut, the processor performs a process of returning the operation frequency band of the internal access point from the first frequency band to the second frequency band.

5. The electronic apparatus according to claim 4,
wherein the processor determines whether or not the terminal apparatus, in which the connection with the internal access point is cut, is the terminal apparatus, which demands to change the operation frequency band, based on identification information of the terminal apparatus.

6. An electronic apparatus comprising:

a wireless communication unit including at least one wireless communication chip and configured to perform a first wireless communication process using an internal access point, which operates in a first frequency band or a second frequency band different from the first frequency band, of the electronic apparatus, and a second wireless communication process different from the first wireless communication process; and a processor that controls communication of the wireless communication unit, wherein in a case where a connection demand with respect to the internal access point is provided, the wireless communication unit transmits information of an operation frequency band of the internal access point on demand to a terminal apparatus through the second wireless communication process, in a case where the wireless communication unit receives a demand to change the operation frequency band into the first frequency band from the terminal apparatus, the processor performs a process of changing the operation frequency band of the internal access point from the second frequency band into the first frequency band, the second wireless communication process is a wireless communication process using a second internal access point which operates in the first frequency band, in a case where the connection demand with respect to the internal access point is provided, the wireless communication unit stops the internal access point, activates the second internal access point for temporary connection, and transmits information of the operation frequency band of the internal access point before stopping the internal access point with respect to the terminal apparatus through the second wireless communication process, and in a case where the demand to change the operation frequency band into the first frequency band is received from the terminal apparatus through the second wireless communication process, the processor changes the operation frequency band from the second frequency band into the first frequency band, and reactivates the internal access point.

7. The electronic apparatus according to claim 6, wherein the wireless communication unit transmits the information of the operation frequency band of the internal access point before stopping the internal access point with respect to the terminal apparatus using a beacon signal in conformity to a Wi-Fi standard in the second wireless communication process.

8. The electronic apparatus according to claim 6, wherein the wireless communication unit transmits identification information and password of the internal access point to the terminal apparatus in the second wireless communication process.

9. The electronic apparatus according to claim 6, wherein the internal access point and the second internal access point have different pieces of identification information.

10. A wireless communication method using a terminal apparatus and an electronic apparatus configured to perform wireless communication using an internal access point, the method comprising:

in response to a connection demand with respect to the internal access point from the terminal apparatus, transmitting information indicative of an operation frequency band of the internal access point at a timing when the connection demand is received, to the terminal apparatus from the electronic apparatus;

when the terminal apparatus is capable of performing the wireless communication using a first frequency band but not a second frequency band different from the first frequency band, transmitting a change demand to change the operation frequency band of the internal access point into the first frequency band to the electronic apparatus from the terminal apparatus in a case where the operation frequency band of the internal access point indicated in the information is the second frequency band and the internal access point is capable of operating in the first frequency band;

stopping operation of the internal access point in the second frequency band and starting operation of the internal access point in the first frequency band in response to receipt of the change demand from the terminal apparatus by the electronic apparatus while the internal access point is being operated in the second frequency band; and performing the wireless communication between the electronic apparatus and the terminal apparatus through the internal access point operating in the first frequency band.

11. The wireless communication method according to claim 10, wherein performing the wireless communication between the electronic apparatus and the terminal apparatus through the internal access point operating in the first frequency band without transmission and reception of the change demand between the terminal apparatus and the electronic apparatus in a case where the operation frequency band of the internal access point indicated in the information is the first frequency band.

12. The wireless communication method according to claim 10, wherein the transmitting of the change demand is performed even in a case where the operation frequency band of the internal access point indicated in the information is the first frequency band so that the wireless communication is performed between the electronic apparatus and the terminal apparatus through the internal access point operating in the first frequency band.

13. The wireless communication method according to claim 12, further comprising stopping operation of the internal access point in the second frequency band and starting operation of the internal access point in the first frequency band in response to connection to all of the terminal apparatus that sent the change demand being cut.

* * * * *